United States Patent
Brooks et al.

[15] 3,668,405
[45] June 6, 1972

[54] OPTICAL SYSTEM FOR IDENTIFYING PULSES

[72] Inventors: Robert E. Brooks, Redondo Beach; Lee O. Heflinger, Torrance, both of Calif.

[73] Assignee: TRW, Inc., Redondo Beach, Calif.

[22] Filed: June 16, 1969

[21] Appl. No.: 791,597

[52] U.S. Cl..............................250/216, 250/219 Q, 350/3.5
[51] Int. Cl..............................................................G08c 9/06
[58] Field of Search..................356/71; 250/216, 226, 219 Q, 250/219 CR, 219 QA; 350/3.5, 162 SF

[56] References Cited

UNITED STATES PATENTS

| | | | |
|---|---|---|---|
| 3,189,746 | 6/1965 | Slobodin et al. | 250/216 |
| 3,483,386 | 12/1969 | Jernigan | 350/161 X |
| 3,532,426 | 10/1970 | Lemmond | 350/3.5 X |

OTHER PUBLICATIONS

Vander Lugt; Signal Detection By Complex Spatial Filtering; Radar Laboratory, Institute of Science & Technology, University of Michigan; Report AD 411473 of Defense Documentation Center; Cameron Station, Alexandria, Va.

Horvath et al., Holographic Technique Recognized Fingerprints; Laserfocus; June, 1967, pp. 18–23
Sincerbox: IBM Technical Disclosure Bulletin Vol. 10; No. 3; Aug. 1967; pp. 267, 268 350/1622P

*Primary Examiner*—Walter Stolwein
*Attorney*—Daniel T. Anderson, Gerald Singer and Alfons Valukonis

[57] ABSTRACT

An optical system for identifying a pulse or wavetrain or for compressing the time duration of such a pulse. This is effected by passing monochromatic light through a cell containing a solid or liquid for sustaining an acoustic wave in the desired frequency spectrum. If the pulse to be identified is an electrical pulse, it may be coupled to the cell to set up the acoustic wave. Alternatively, the pulse may be already be an acoustic pulse. The resulting diffracted light wave is then optically filtered by an optical filter such as a hologram on which has previously been recorded a fringe or interference pattern of the pulse to e identified or to be compressed. Accordingly, if the acoustic wave corresponds to the desired electrical pulse, the light passing the hologram may be detected by a detector. If the time duration of the pulse is to be compressed, the hologram or optical filter is so arranged that it will focus the light from the laser substantially in a point or other predetermined area where its exact position may then be detected.

5 Claims, 2 Drawing Figures

PATENTED JUN 6 1972 3,668,405

Robert E. Brooks
Lee O. Heflinger
INVENTORS

BY Eli A. Osa.

ATTORNEY

OPTICAL SYSTEM FOR IDENTIFYING PULSES

BACKGROUND OF THE INVENTION

This invention relates generally to optical systems and particularly to a system for either identifying a pulse or wavetrain or compressing its time duration by optical means.

A significant development of radar technology has been the development of the so-called chirp or pulse compression radar. This has been described, for example, by J. R. Klauder, A. C. Price, S. Darlington and W. J. Albershim, in Bell System Technical Journal, volume 39, pages 745 to 820, published in July 1960. Earlier radar systems attempted to obtain long range and a high degree of information by transmitting a radio-frequency pulse of very short duration but with high peak power. On the other hand, the chirp radar makes it possible to transmit a relatively long pulse of radio-frequency energy which is, of course, capable of transmitting a large amount of energy without exceeding the peak power limitations of the transmitter. The transmitted pulse is modulated in some characteristic fashion and subsequently correlated with the received or echo pulse against a previously stored record of itself. In this case provision must be made for the expected doppler-shift. This makes it possible to achieve very high range resolution. This chirp radar system has sometimes been called a pulse compression system because the output of echo pulse may be made much shorter or compressed in time duration with respect to the transmitted pulse.

The radar receiver or detector requires a matched filter for detecting the chirp transmitted pulse. This filter contains a stored record of the pulse shape. Conventionally these filters are of the electronic type and hence, can be used for the generation of the transmitted pulse as well as for the detection of the echo pulse. However, by the very nature of an electronic filter this imposes limitations on the type of modulation that may be imposed on the transmitted pulse. Generally a chirp pulse has its frequency modulated in accordance with a linear relationship.

Recently it has been proposed to use optical filters for detecting and compressing radar pulses obtained from a chirp radar system. Such techniques have been described, for example, by M. B. Schultz, M. G. Holland and L. Davis, Jr. in Applied Physics Letters, volume 11 on pages 237 to 240 and by J. H. Collins, E. G. H. Lean and H. J. Shaw, also in Applied Physics Letters, volume 11, pages 240 to 242 of Oct. 1, 1967. As proposed in these two papers, the radar pulse is linearly frequency modulated or chirped. This will, of course, provide the pulse with a characteristic signature or pattern. The received or echo pulse is applied to an acoustic transducer which converts the signal into an acoustic wave propagating through a transparent acoustic cell. Bragg diffraction of the light of a laser passing through the cell in combination with the particular pattern of the acoustic wave causes the light to come to a focus. This focused light spot is swept along at the speed of acoustic propagation through the cell. The pulse may be timed by a narrow slit and detected by a photodetector.

Essentially, the particular shape or pattern of the acoustic wave causes the light to focus. Thus the spacing of the acoustic wave is essentially that of a linear Fresnel zone plate, of which the linear frequency modulation is an approximation. Since it is essentially the spacing of the wave in the acoustic cell which causes the light from the laser to focus at a point, this places a narrow restriction on the class of pulse signatures. In other words, the type of modulation permissible for a pulse which may subsequently be detected restricts the type of pulses or wavetrains which may be detected.

It is accordingly an object of the present invention to provide an optical system including an optical filter capable of focusing any arbitrary acoustic wave either in a point or in a predetermined pattern or area and which permits to identify the pulse or to compress the time duration of the pulse regardless of the type of modulation thereof.

Another object of the present invention is to utilize a hologram as an optical filter and lens system for focusing the waves from an acoustic cell to compress the time duration of the output pulse compared to that of the input pulse.

A further object of the present invention is to provide a single optical matched filter such as a hologram for identifying a plurality of different pulse shapes with a single filter.

Still another object of the present invention is to utilize a hologram as an optical filter and lens for identifying an acoustic wave corresponding to a predetermined pulse by redirecting light passing through the optical cell into a predetermined pattern or area.

SUMMARY OF THE INVENTION

A system for identifying a pulse such as an electrical pulse by optical means in accordance with the present invention includes a cell containing a material capable of sustaining an acoustic wave. This could be any suitable liquid or solid material which is transparent to the light used. In the case of an electrical signal, a transducer may be coupled to the cell for converting the electrical signal into an acoustic wave. This acoustic wave will travel at a predetermined velocity through the material of the cell.

A light source is provided for generating a substantially monochromatic beam of light and projecting it through the cell. This may, for example, consist of a laser which may either develop a continuous or a pulsed light beam in accordance with the specific requirements. The optical filter of the invention is interposed into the path of the light beam and may either be arranged between the light source and the cell or may be disposed after the cell. A pattern corresponding to the predetermined acoustic wave has previously been recorded on the optical filter. The filter may, for example, be a hologram. Finally, a light detector may be provided for generating an electric output pulse in response to light modulated by the acoustic wave passing the filter and being projected on the detector.

The hologram may also be so arranged that it will focus the light in a small area on the detector in response to the light being modulated by the acoustic wave corresponding to the pulse to be identified.

The novel features that are considered characteristic of this invention are set forth with particularity in the appended claims. The invention itself, however, both as to its organization and method of operation, as well as additional objects and advantages thereof, will be best understood from the following description when in connection with the accompanying drawing.

DESCRIPTION OF THE PREFERRED EMBODIMENT

Figure 1:
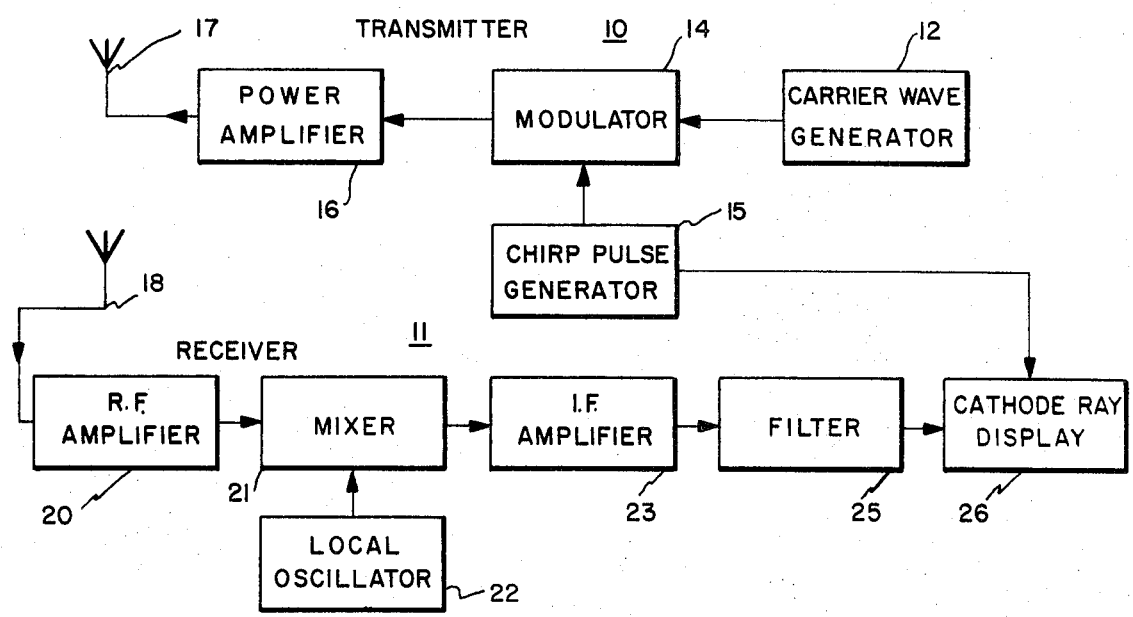
FIG. 1 is a block diagram of a transmitter and receiver of a chirp radar system utilizing the optical filter of the invention.

Referring now to the drawing and particularly to FIG. 1, there is illustrated in block form a radar system which may utilize the optical filter of the present invention. The radar system includes generally a transmitter 10 and a receiver 11. The transmitter 10 includes a carrier wave generator 12 followed by a modulator 14. In the modulator 14 the carrier were developed by the generator 12 is modulated in accordance with an electrical pulse or signal such as a chirp pulse generated by a generator 15. Accordingly the chirp pulse generator has its output connected to the modulator 14 which in turn impresses the modulated carrier wave on a power amplifier 16 to develop an amplified carrier wave pulse modulated by the chirp pulse. This signal is then transmitted by an antenna 17.

The receiver 11 includes a suitable antenna 18 for receiving the echo of the transmitted chirp pulse. The received echo pulse may be amplified by a radio-frequency amplifier 20 and may be impressed on a mixer 21 which is coupled to a local oscillator 22. Accordingly the difference between the radio frequency and the local oscillator frequency is obtained by the mixer 21 and is then impressed on an intermediate-frequency amplifier 23.

In accordance with the present invention there is now provided an optical filter 25, the nature of which will be subsequently explained in connection with FIG. 2. This optical filter 25 permits either to identify the electrical pulse received by the receiver 11 or to compress the time duration of an identified pulse. The identified pulse or the pulse having its time duration reduced or compressed may then be displayed by a cathode ray display 26. This in turn is coupled to the chirp pulse generator 15 so that the time delay, for example, between the transmitted and the returned echo pulse may be determined. This, of course, would be an indication of the distance between the transmitter and the target returning the echo.

As previously indicated the chirp radar system of FIG. 1 is entirely conventional with the exception of the optical filter 25, which will now be explained in connection with FIG. 2.

Figure 2:
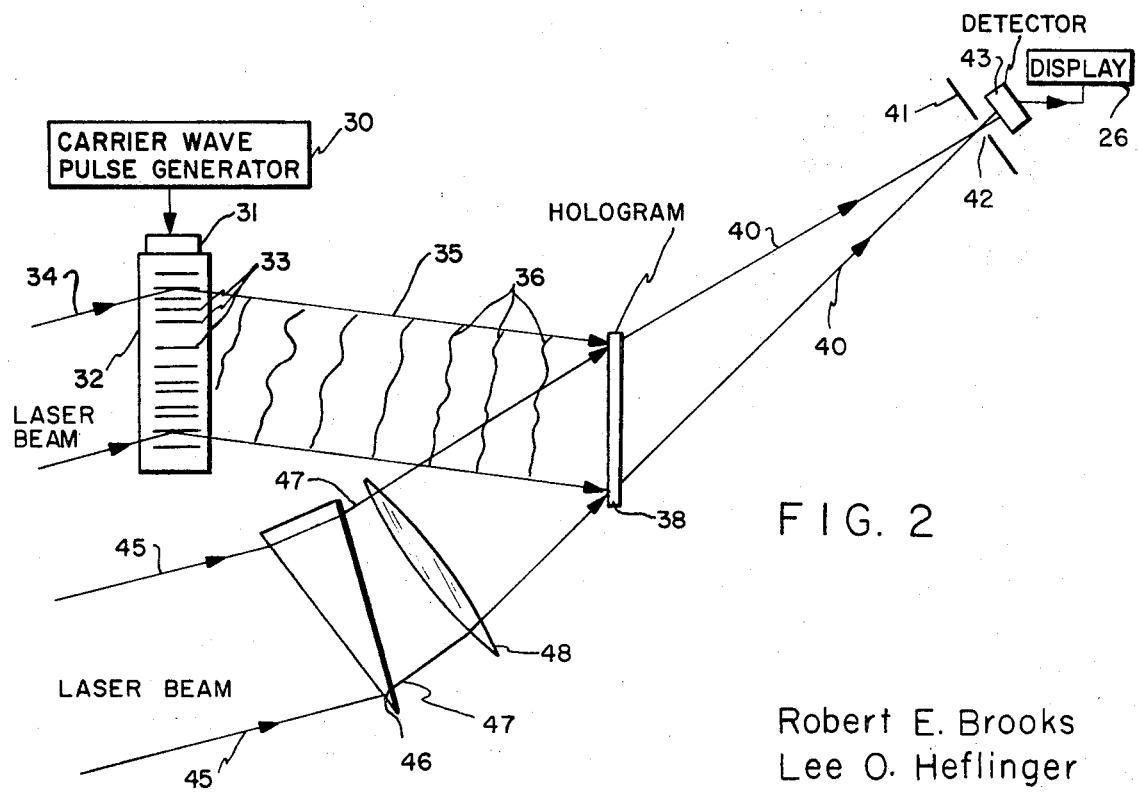
FIG. 2 is a schematic representation of the optical filter of the invention including a laser beam, an acoustic cell and a hologram.

FIG. 2 shows a carrier wave pulse generator 30. This may either be a radio-frequency or intermediate-frequency carrier wave modulated by the pulse to be identified or compressed. For example, the carrier wave pulse generator 30 may be identical with the intermediate-frequency amplifier 23. Accordingly the carrier wave modulated by the pulse to be identified is impressed on a transducer 31 coupled to a cell 32. The cell 32 contains a suitable liquid or solid which is transparent to the light used and which is capable of sustaining an acoustic wave. Accordingly the cell may, for example, be filled with a liquid such as water or may consist of a solid such as quartz or sapphire. The transducer 31 may, for example, be a suitable piezoelectric crystal, such as a crystal of Rochelle salt (sodium potassium tartrate) which may interact with a liquid such as water. On the other hand, the transducer 31 may also consist of cadium sulphide or zinc oxide. In any case, when the transducer 31 is energized by the carrier wave modulated by a pulse it will set up an acoustic wave traveling through the cell 32 at the velocity of sound. The acoustic wave has been indicated schematically by spaced lines 33. Alternatively, the pulse may directly be the acoustic wave 33.

A parallel beam of light indicated schematically by the lines 34 passes through the cell 32. This is preferably beam of monochromatic, coherent light such as is generated by any conventional laser. Accordingly the beam 34 has been designated in the drawing as a laser beam.

The light beam 34 passing through the cell 32 is now diffracted or scattered by the acoustic wave front propagating through the cell 32. The diffracted beam is shown schematically at 35. The shape of the phase front 36 of the diffracted beam depends, of course, on the phase characteristics of the carrier-wave pulse obtained from the generator 30.

The diffracted light beam 35 eventually impinges on an optical filter 38. This may, for example, be an opaque plate such as a metallic plate having a suitable pattern cut out. Such a plate may form an amplitude mask which masks the diffracted light beam in accordance with its amplitude. Alternatively a phase mask may be used, this may, for example, consist of glass plate having a varying thickness so as to delay the wave front by different amounts depending on the thickness of the glass. More conveniently however, the optical filter 38 may consist of a previously recorded hologram. Such a hologram constitutes either an amplitude mask or a phase mask or both. The hologram has previously been recorded in a manner to be subsequently explained by illuminating a suitable recording material such as a photographic plate or film with the same coherent light beam through an acoustic wave corresponding to a predetermined carrier-wave pulse.

The optical filter or hologram 38 operates as a lens. It may be arranged so that it will focus the light beam substantially in a point provided the light beam passes through an acoustic wave of predetermined characteristics. Accordingly the light passing through the hologram 38 may be focused as shown by the lines 40. It may be passed passe tthrough an aperture plate 41 having a suitable aperture 42 and may be detected by a detector 43. The output of the detector 43 may be impressed on the display device 26 which may be the cathode ray display 26 of FIG. 1.

Assuming therefore that the optical filter 38 is a hologram and further that it is made so as to focus the light in a point, the arrangement serves as a pulse compressor. Looked at in a different way, the detector 43 detects the time of arrival of the return or echo pulse.

It should be noted that the optical filter 38 need not necessarily be arranged between the dell 32 and the detector 43. Alternatively it may be disposed between the source of the laser beam 34 and the cell 32.

It is well known in the art that the hologram can be arranged so as to act as a lens to focus the light in a single point. This has, for example, been disclosed by D. Gabor in Nature, volume 208, pages 422 to 423, in the issue of Oct. 30, 1965. It is also known that a double-exposure or multi-exposure hologram may be prepared. In other words, it is feasible to record the characteristic pattern obtained from two or more different carrier-wave pulses on a simple hologram. Such a multiple-exposure hologram is preferably arranged in such a manner that for each particular pulse signature a convergent light beam is focused at a different location. Since there are now several hologram recordings on the same hologram, there is a certain amount of "cross-talk" or noise caused by the interference of one recording with the others. However, it has been found that this noise or cross-talk does not focus. It has been proven that a very large number of individual point object holograms may be recorded on a photographic plate with adequate signal-to-noise ratio for good detection. An abstract of this work has been published by J. T. La Macchia and D. L. White in the Journal of the Optical Society of America, volume 57, page 1412, November 1967 issue.

However it is not necessary to arrange the optical filter 38 in such a way that substantially all the light from the laser beam 34 is focused in a point defined by the aperture 42. The system may also be used merely for the identification of a particular pulse having a particular pulse signature or frequency-time relationship. In that case the light diffracted by the cell 32 will simply sweep past the aperture 42 into the detector 43 to generate a characteristic output pulse which simply indicates that the pulse to be identified has actually been received.

When it is desired merely to identify a particular pulse, the optical filter or hologram 38 may be arranged in such a way that it will sort the optical wave passing through the hologram in such a manner that the light is arranged in a particular pattern. Thus instead of concentrating all the light substantially in a point, the light may be concentrated in a rectangular area which may be made to pass the slit 42 of the detector 43. Alternatively the light may even be arranged to form a particular pattern such as the letter A. It will subsequently be explained that the manner in which the light may be concentrated or rearranged depends primarily on the reference beam by means of which the original hologram was taken. It may simply be visualized that the hologram rearranges the irregular wave front which is obtained by passing the light through the acoustic wave into an ordered pattern such as a plane wave.

It will be understood that the optical filter of the present invention as illustrated in FIG. 2 need not be used with a chirp radar system of the type shown in FIG. 1. It may find application where a pulse with a particular frequency-time relationship is to be identified or where the duration of a carrier-wave modulated pulse is to be compressed in time duration.

The hologram 38 may, for example, be generated in the manner now to be explained in connection with FIG. 2. The laser beam is split up into two portions, one of which is the light beam 34, while the other one is an adjacent light beam 45. The original laser beam may be split by any conventional beam splitter. The laser beam 45 may not be deflected by a glass wedge or prism 46 to provide a light beam 47. The light beam 47 may now be made to focus by a focusing lens 48 to provide a beam which impinges on the hologram 38. This beam is preferably focused in such a manner that it is caused to pass or to focus at the aperture 42. At the same time, the pulse to be identified or to be compressed is generated by the pulse generator 30 and subsequently generates the traveling acoustic wave 33. This permits a recording of the hologram by two light beams. One beam is the scene beam 35 and the other is the reference beam 47. The scene beam 35 has been modulated or modified by the acoustic wave 33 which scatters the scene beam 34. Accordingly what is recorded on the hologram 38 is an interference pattern which may be considered either an amplitude or phase mask or both. Such a hologram may be used as pointed out above for the unique identification of another carrier wave modulated by a pulse corresponding to the original pulse. Alternatively it can be used to compress the time duration of such a pulse, thereby to determine the precise time of arrival of an echo pulse.

It will now be apparent that the light of the scene beam 35 passing through the hologram 38 can be made to show up in a characteristic pattern of intensity or phase of the wave depending on the manner in which the reference beam 47 is made to focus. Thus the light passing through the hologram can be made to focus in one of several points or in any particular area, such as a rectangular area which can readily be made to pass the slit 42 of the detector or in a particular letter or other desired characteristic pattern.

Instead of recording the hologram 38 as previously explained, it is also feasible to generate the hologram in any other manner. To this end the wave form of the carrier wave pulse is analyzed and a digital computer is programmed so as to compute mathematically the form of the hologram which results when monochromatic light is diffracted by the corresponding acoustic wave. The actual shape of the hologram may then be plotted on a large scale in accordance with the computer generated information by an X–Y plotter in a conventional manner. This large plot of a hologram may then be photographically reduced in size to obtain a transparency which may serve as a hologram.

If the hologram is made by direct recording in the manner explained in connection with FIG. 2 it may be necessary to use a pulsed laser having a pulse duration of the light beam which is shorter than that of the compressed detector pulse to form the appropriate hologram. It may also be convenient or even necessary to shift the frequency of the convergent light beam to match the doppler-shift imparted by the acoustic cell 32.

There has thus been disclosed an optical filter used in conjunction with a solid or liquid cell in which an acoustic wave is generated corresponding to a carrier-wave pulse. The filter may, for example, consist of a hologram arranged to focus the light in a point when the acoustic wave corresponds to the desired electrical pulse. This will compress the time duration of the received pulse. On the other hand, the system may also be used for identification of a pulse having a particular signature or frequency-time relationship.

In this case the optical filter, such as a hologram, may be so arranged that a pulse to be identified causes the characteristic light pattern to appear when monochromatic light passes through the filter. The identification system of the present invention is free from the limitations of prior conventional systems where the optical filter itself had to serve as a focusing lens.

What is claimed is:

1. A system for identifying an electrical pulse by optical means comprising:
    a. a cell containing a material capable of sustaining an acoustic wave;
    b. a transducer coupled to said cell for converting an electrical signal into an acoustic wave;
    c. an electric generator for developing the electric pulse to be identified coupled to said transducer for setting up an acoustic wave in said cell which will travel at a predetermined velocity;
    d. a light source for generating a substantially monochromatic beam of light and projecting it through said cell;
    e. recording material on which a pattern corresponding to a predetermined acoustic wave has previously been recorded to provide a hologram, said hologram being interposed into the path of said light beam, said hologram having been previously recorded by a scene beam diffracted by said predetermined acoustic wave and a reference beam converging substantially in a point behind the recording material, said scene and reference beams impinging on the recording material on the same side thereof, whereby the resulting hologram focuses without optical elements substantially in a point behind the hologram when illuminated by a light beam modulated by the predetermined acoustic wave; and
    f. light responsive means responsive to light modulated by said acoustic wave passing said hologram and being projected thereby on said light responsive means.

2. The method of identifying a pulse by optical techniques comprising the steps of:
    a. transforming the pulse to be identified into an acoustic wave;
    b. generating a beam of substantially monochromatic light and projecting it through the acoustic wave;
    c. passing the light beam through a recording material on which a pattern corresponding to a predetermined acoustic wave has previously been recorded to provide a hologram by a scene beam diffracted by the predetermined acoustic wave and a reference beam converging substantially in a point behind the recording material and impinging on the same side of the recording material, whereby the resulting hologram focuses without optical elements substantially in a point behind the hologram when illuminated by a light beam modulated by the predetermined acoustic wave; and
    d. detecting the light which has passed through the hologram for generating an electric output pulse in response to the predetermined acoustic wave.

3. A system as defined in claim 1 wherein said cell contains a liquid.

4. A system as defined in claim 1 wherein said cell contains a solid.

5. A system as defined in claim 1 wherein said light source is a laser.

* * * * *